United States Patent
Abe et al.

(10) Patent No.: US 6,972,973 B2
(45) Date of Patent: Dec. 6, 2005

(54) VOLTAGE BOOSTER HAVING NOISE REDUCING STRUCTURE

(75) Inventors: Hirofumi Abe, Gamagori (JP);
Hirokazu Itakura, Hazu-gun (JP);
Hiroyuki Ban, Hazu-gun (JP); Shoichi Okuda, Nukata-gun (JP); Kingo Ota, Nishio (JP)

(73) Assignee: Denso Corporation, Kariya (JP)

( * ) Notice: Subject to any disclaimer, the term of this patent is extended or adjusted under 35 U.S.C. 154(b) by 179 days.

(21) Appl. No.: 10/716,560

(22) Filed: Nov. 20, 2003

(65) Prior Publication Data

US 2004/0136212 A1 Jul. 15, 2004

(30) Foreign Application Priority Data

Jan. 9, 2003 (JP) .............................. 2003-003317
Jan. 14, 2003 (JP) .............................. 2003-005782

(51) Int. Cl.[7] ........................... H02M 3/18; G05F 3/08

(52) U.S. Cl. ...................................... 363/60; 327/536

(58) Field of Search .................... 363/59, 60; 323/288, 323/299; 327/536, 537, 589

(56) References Cited

U.S. PATENT DOCUMENTS

| | | | |
|---|---|---|---|
| 5,812,018 A | * | 9/1998 | Sudo et al. .................. 327/537 |
| 6,469,569 B1 | | 10/2002 | Miyamitsu |
| 6,603,673 B2 | * | 8/2003 | Yamamoto .................... 363/60 |
| 6,816,000 B2 | * | 11/2004 | Miyamitsu .................. 327/536 |
| 2003/0085755 A1 | | 5/2003 | Miyamitsu et al. |

OTHER PUBLICATIONS

John F. Dickson, "On-Chip High-Voltage Generation in MNOS Integrated Circuits Using an Improved Voltage Multiplier Technique", *IEEE Journal of Solid-State Circuits*, Jun. 1976, pp. 1-6 (discussed in p. 3 of the spec.).

* cited by examiner

*Primary Examiner*—Adolf Berhane
(74) *Attorney, Agent, or Firm*—Posz Law Group, PLC (57) ABSTRACT

In a voltage booster, a voltage detection circuit detects a battery voltage as an input voltage. If the input voltage is lower than a threshold level, an oscillation circuit outputs a gate signal having a relatively high frequency to increase the driving performance of a driving circuit. If the input voltage is higher than the threshold level, the frequency of the gate signal is lowered so as to prevent the driving performance of the driving circuit from rising to an excessively high value. As a result, a predetermined boosted voltage can be obtained regardless of variations in input voltage without using a filter for eliminating noise.

17 Claims, 9 Drawing Sheets

VOLTAGE BOOSTER HAVING NOISE REDUCING STRUCTURE

CROSS REFERENCE TO RELATED APPLICATION

This application is based on and incorporates herein by reference Japanese Patent Applications No. 2003-3317 filed on Jan. 9, 2003 and No. 2003-5782 filed on Jan. 14, 2003.

FIELD OF THE INVENTION

The present invention relates to a voltage booster, which is referred to a charge pump circuit adopting a charge pumping method and generates less noise.

BACKGROUND OF THE INVENTION

In a voltage booster, electric connections of capacitors connected to each other by diodes at a plurality of stages are switched from a state of connection to another at a typical frequency of about 100 kHz so that electric charge is accumulated initially in the capacitors, and the accumulated electric charge is then transferred sequentially from any specific one of the capacitors to one of the capacitors, which follows the specific capacitor. Thus, the voltage booster boosts the input voltage. In the operation to boost the voltage, steep charging and discharging currents flowing through the capacitors are emitted to the external side as noise by way of a voltage input terminal of the voltage booster.

A voltage booster, which reduces the amount of such noise, is disclosed in U.S. Pat. No. 6,469,569 (JP-A-2001-69747). This voltage booster comprises a main electric charging/discharging circuit and an auxiliary electric charging/discharging circuit. At a starting time of the voltage booster, both of the electric charging/discharging circuits are operated concurrently to increase the driving performance of a driving circuit serVBg as a gate circuit so as to shorten the charging time of the capacitors. In a steady state where a large driving performance is not required, on the other hand, only the main electric charging/discharging circuit is operated to reduce the driving performance to a value, which is small in comparison with the driving performance at the starting time, so as to result in a small quantity of a loss because of low power consumption and a decreased amount of the noise.

If the voltage booster is employed in an electronic control apparatus mounted on a vehicle, the voltage booster is put in a condition where the input voltage of the voltage booster greatly varies in accordance with the voltage of a battery used in the vehicle. In such a condition, it is assumed that the voltage booster is connected to a predetermined load. In this case, the voltage booster must output a boosted voltage at a predetermined level such as 12 V or higher even if the voltage of the battery decreases to a lower level as far as the voltage of the battery does not become lower than a guaranteed minimum operating input voltage such as 4.5 V.

Since the voltage booster is designed by assuming that the voltage booster is used under a condition in which the voltage is most difficult to boost, the voltage boosting performance reaches an excessive level even when the voltage of the battery is in a normal or standard range such as a voltage of about 12 V. Such an excessive voltage boosting performance raises a problem that the amount of generated noise also increases as well. If the voltage booster is used as a circuit for controlling an electronic control apparatus in a vehicle, in particular, the noise becomes radio noise in the AM band.

In order to solve such a noise problem, a filter comprising a reactor and a capacitor is inserted into an input power supply line of the voltage booster to suppress the radiation of the noise. In order to cut off the noise effectively, however, it is necessary to employ a filter comprising a reactor with a large inductance and a capacitor having a large capacitance. However, a reactor with a large inductance and a capacitor having a large capacitance are filter electronic components, which are large in size, raising a mounting problem.

Another conventional technology of the voltage booster is disclosed in a technical literature authored by J. F. Dickson with a title of "On-Chip High-Voltage Generation in NMOS Integrated Circuits Using an Improved Voltage Multiplier Technique," an IEEE journal of solid state circuits, June 1976, volume SC-11, number 3, pages 374–378. In the voltage booster of this technology, connections of capacitors connected to each other by diodes at a plurality of stages are switched from one state of connection to another at a typical switching frequency of the order of 100 kHz so that electric charge is accumulated initially in the capacitors. Then, the electric charge is transferred sequentially from any specific one of the capacitors to one of the capacitors, which follows the specific capacitor, to boost the resulting voltage.

In the operation to boost the voltage, steep charging and discharging currents flowing through the capacitors are emitted to the external side as noise by way of a voltage input terminal of the voltage booster.

As a countermeasure for noise reduction according to this conventional technology, it is also necessary to suppress radiation of noise by inserting the similar filter.

SUMMARY OF THE INVENTION

It is thus a first object of the present invention to provide a voltage booster capable of producing a boosted voltage without regard to variations in input voltage as well as capable of reducing generated noise without employing a noise filter.

According to a first aspect of the present invention, in a voltage booster, one terminal of each of capacitors is connected to a common junction point between diodes, and a first voltage and a second voltage as alternating voltages are supplied to the other terminal of each of the capacitors alternately. This allows electrical charge to be accumulated in the capacitors and transferred from any of the capacitors to the next one of the capacitors sequentially, so that a voltage is boosted by adoption of a charge pumping method.

By boosting the voltage in this way, a driving circuit employing the capacitors and the diodes exhibits a maximum driving performance to boost the voltage to a level at least equal to a predetermined voltage level at a voltage output terminal of the driving circuit. The driving circuit exhibits such a maximum driving performance even for a predetermined minimum input voltage supplied to a voltage input terminal of the driving circuit with a predetermined load connected to the voltage output terminal. As a result, it is possible to output a boosted voltage at the predetermined voltage level even if the input voltage supplied to the voltage input terminal varies provided that the input voltage does not decrease to a level below the predetermined minimum input voltage.

In addition, a voltage detection circuit for detecting the input voltage reduces the driving performance of the driving circuit by such a reduction quantity that, the higher the input voltage detected by the voltage detection circuit, the greater the reduction quantity. It is thus possible to prevent the driving performance of the driving circuit from becoming excessive even if the input voltage exceeds the predetermined minimum input voltage and, hence, possible to reduce the amount of noise generated by a voltage booster employing the driving circuit and the voltage detection circuit. Instead of eliminating the generated noise, the voltage booster suppresses the noise generation itself. Thus, it is not necessary to add the conventionally used filter to the voltage booster.

According to a second aspect of the present invention, in a voltage booster, one terminal of each of capacitors is connected to a common junction point between diodes and that a first voltage and a second voltage as alternating voltages are supplied to the other terminal of each of the capacitors alternately. This allows electrical charge to be accumulated in the capacitors and transferred from any of the capacitors to the next one of the capacitors sequentially, so that a voltage is boosted by adoption of the charge pumping method.

Charging and discharging currents flowing through the capacitors in a pumping process to supply the first voltage and the second voltage as alternating voltages to the other terminal of each of the capacitors alternately are controlled by a current regulation circuit. On this account, no charging and discharging currents exceeding a controlled current flow through the capacitors, so that the amount of noise generated by the voltage booster can be reduced. Instead of eliminating the generated noise, the voltage booster suppresses the noise generation itself. Thus, it is not necessary to add traditionally used filter to the voltage booster.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
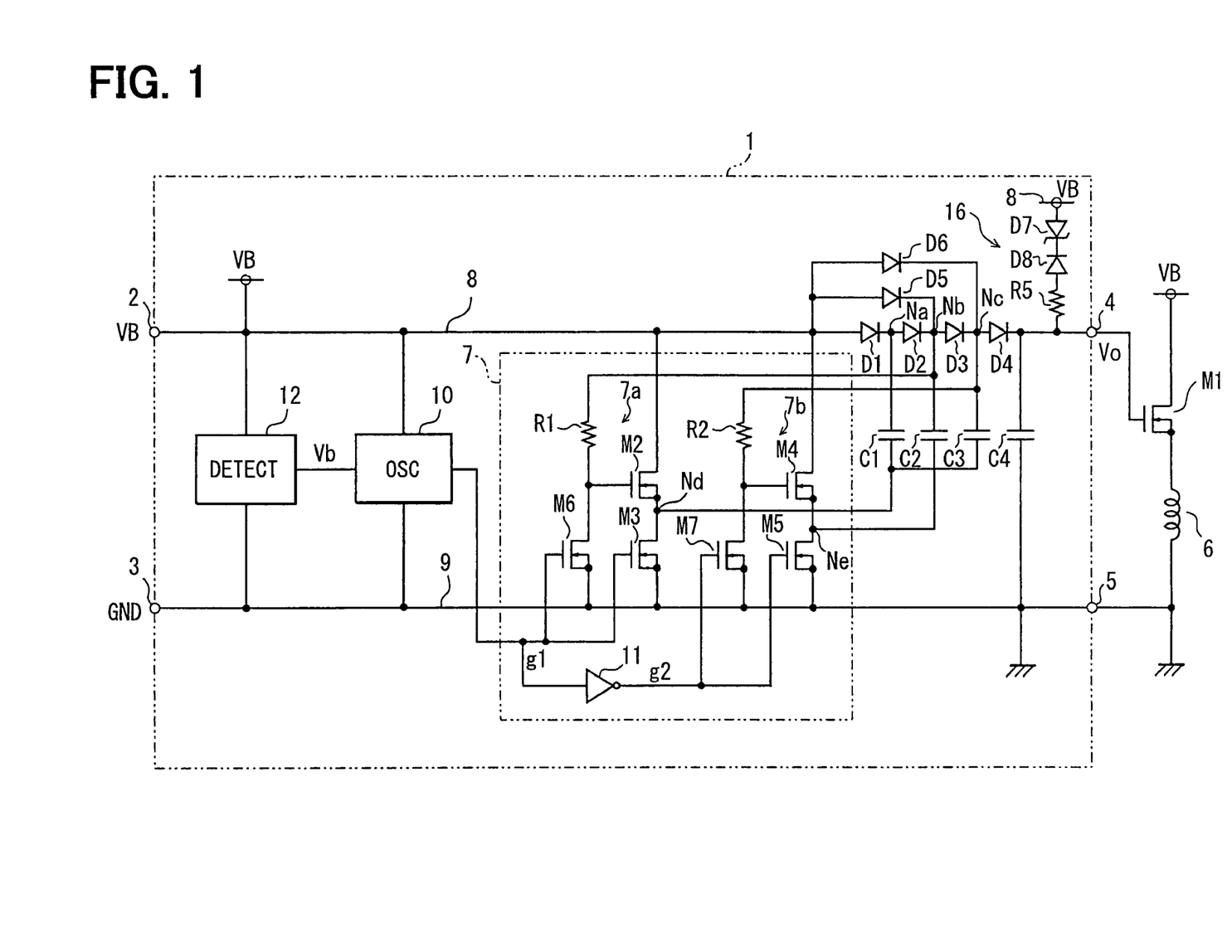
FIG. 1 is a circuit diagram showing the electrical configuration of a voltage booster implemented as a first embodiment of the present invention.

Referring first to FIG. 1, a voltage booster 1 is employed typically in an electronic control apparatus mounted on a vehicle as a circuit for generating the gate voltage of an N-channel MOS transistor M1 functioning as a high-side switch for driving a solenoid 6 of an electric load. Components of the voltage booster 1 except capacitors C1 to C4 compose a portion of a control IC not shown in the figure.

The voltage VB of a battery is supplied from the positive-electrode terminal and the negative-electrode terminal of the battery to a voltage input terminal 2 and an input terminal 3 of the voltage booster 1 by way of typically an ignition switch. The nominal value of the battery voltage VB, which is the input voltage of the voltage booster 1, is 12 V. However, the battery voltage VB greatly changes in accordance with the length of a period during which the battery has been used, the usage condition, the condition of the vehicle and other factors.

A voltage output terminal 4 of the voltage booster 1 is connected to the gate of the transistor M1. The battery voltage VB is applied to the drain of the transistor M1. The solenoid 6 is connected between the source of the transistor M1 and an output terminal 5 of the voltage booster 1. Although FIG. 1 shows only one transistor M1, a plurality of N-channel MOS transistors for other electric loads are connected to the output terminal 4 in the similar manner.

With the transistor M1 and others connected to the output terminal 4 as a load of the voltage booster 1, the voltage booster 1 exhibits a maximum performance to generate an output voltage (boosted voltage) Vo close to a predetermined level such as (VB+8V) even if the input voltage (battery voltage VB) decreases to a lower level (less than 12 V) as far as the voltage of the battery does not become lower than a typical minimum input voltage of 4.5 V.

The input terminal 2 and the output terminal 4 are linked to each other by diodes D1, D2, D3 and D4, which are connected to each other in series by orienting the anodes of all the diodes D1, D2, D3 and D4 to the input terminal 2. In FIG. 1, Na denotes the common junction point between the diodes D1 and D2, Nb denotes the common junction point between the diodes D2 and D3, and Nc denote the common junction point between the diodes D3 and D4. A diode D5 is connected between the input terminal 2 and the node Nb with anode of the diode D5 wired to the input terminal 2. Similarly, a diode D6 is connected between the input terminal 2 and the node Nc with anode of the diode D6 wired to the input terminal 2. The nodes Na, Nb and Nc are connected to ones of the terminals of capacitors C1, C2 and C3, respectively. A predetermined voltage generated by a driving circuit 7 is supplied to the other terminals of the capacitors C1, C2 and C3. It is to be noted that a smoothing capacitor C4 is connected between the output terminals 4 and 5.

In the driving circuit 7, N-channel MOS transistors M2 and M3 are connected in series between a power supply line 8 linked to the input terminal 2 and a power supply line (ground line) 9 linked to the input terminal 3. Similarly, N-channel MOS transistors M4 and M5 are connected in series between the power supply line 8 and the power supply line 9. The common junction point Nd between the source of the transistor M2 and the drain of the transistor M3 is connected to the other terminals of the capacitors C1 and C3. On the other hand, the common junction point Ne between the source of the transistor M4 and the drain of the transistor M5 is connected to the other terminal of the capacitor C2.

An N-channel MOS transistor M6 is connected between the gate of the transistor M2 and the power supply line 9. The gate of the transistor M2 is also connected to the node Nb by a resistor R1. Similarly, an N-channel MOS transistor M7 is connected between the gate of the transistor M4 and the power supply line 9. The gate of the transistor M4 is also connected to the node Nc by a resistor R2. The transistors M2, M3, M6 and resistor R1 compose a partial driving circuit 7a, whereas the transistor M4, the transistors M5, M7 and resistor R2 compose a partial driving circuit 7b.

The gates of the transistors M3 and M6 are wired to each other to receive a gate signal g1 generated by an oscillation circuit 10. Similarly, the gates of the transistors M5 and M7 are wired to each other to receive a gate signal g2 generated by an inverter 11 as the inverted signal of the gate signal g1. The transistors M2 to M7 (switching devices) employed in the driving circuit 7 are each a power MOSFET having a high withstand voltage.

A voltage detection circuit 12 is a circuit for outputting a detection voltage Vb, which is a partial voltage obtained by dividing the input voltage (battery voltage VB) supplied between the input terminals 2 and 3. The oscillation circuit 10 is provided as a driving performance adjustment circuit for switching the frequency of the gate signal g1 from one of 2 values to another in accordance with the detection voltage Vb.

Figure 2:
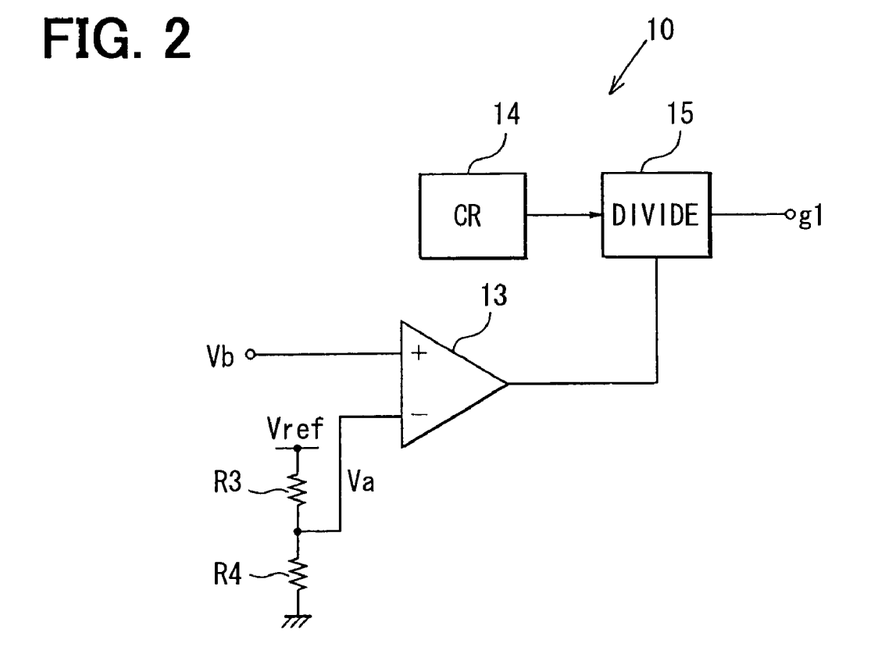
FIG. 2 is a circuit diagram showing the electrical configuration of an oscillation circuit employed in the first embodiment.

Specifically, the oscillation circuit 10 has an electrical configuration shown in FIG. 2. In this configuration, a comparator 13 compares a switching reference voltage (threshold voltage) Va with the detection voltage Vb. The switching reference voltage Va is obtained by dividing a fixed reference voltage Vref by using a voltage divider comprising resistors R3 and R4. A frequency division circuit 15 outputs the gate signal g1 having a frequency equal to a fraction of the frequency of a clock signal generated by a CR oscillation circuit 14. The value of the fraction is determined in accordance with the level of a voltage output by the comparator 13.

Since the voltage booster 1 executes open loop control for the boosted voltage Vo, it is likely that the boosted voltage Vo increases to an excessively high level. In order to solve this problem, a clamp circuit 16 is connected between the power supply line 8 and the output terminal 4. The clamp circuit 16 comprises an 8V Zener diode D7, a diode D8 and a resistor R5.

In operation of the embodiment, when the battery voltage VB is applied between the input terminals 2 and 3 by, for example, turning on an ignition switch of the vehicle, initial electric charges are accumulated in the capacitors C1 to C4. These initial electric charges are accumulated in the capacitor C1 by way of the diode D1, the capacitor C2 by way of the diode D5 and the capacitor C3 by way of the diode D6.

Thus, by providing the diodes D5 and D6, the voltage of the capacitor C2 (voltage appearing at the node Nb) and the voltage of the capacitor C3 (voltage appearing at the node Nc) both reach a level VB−Vf where Vf is the forward-direction voltage drop across each of the diodes D5 and D6. As a result, in comparison with the conventional configuration not employing the diodes D5 and D6, it is possible to obtain an initial voltage higher by a difference of Vf at the node Nb and an initial voltage higher by a difference of a difference of 2·Vf at the node Nc.

Since the voltages appearing at the nodes Nb and Nc are used as the gate voltages of the transistors M2 and M4 respectively in this embodiment, at the start of the operation to boost the input voltage, higher levels of the gate voltages can be assured. The higher levels of the gate voltages are thus devised to make it possible to turn the transistors M2 and M4 on with a high degree of reliability even if the battery voltage VB decreases to the minimum input value of 4.5 V.

In the driving circuit 7, the partial driving circuit 7a including the transistors M2, M3 and M6 operating in accordance with the gate signal g1 works complementarily to the partial driving circuit 7b including the transistors M4, M5 and M7 operating in accordance with the gate signal g2, which is the inverted signal of the gate signal g1. When the transistors M3 and M6 are turned on, the transistor M2 is turned off. Similarly, when the transistors M5 and M7 are turned on, the transistor M4 is turned off. That is, the transistor M2 operates complementarily to the transistor M3 while the transistor M4 operates complementarily to the transistor M5.

After the CR oscillation circuit 14 employed in the oscillation circuit 10 starts oscillating to generate the clock signal to be eventually output as the gate signal g1, the following operations are carried out. It is to be noted that the input voltage (that is, the battery voltage VB) corresponds to a first voltage and the ground voltage corresponds to a second voltage.

(1) When the transistors M3 and M4 are turned on and the transistors M2 and M5 are turned off, a charging current flows from the input terminal 2 to the input terminal 3 by way of the power supply line 8, the diode D1, the capacitor C1, the transistor M3 and the power supply line 9, accumulating an electric charge in the capacitor C1.

(2) When the transistors M3 and M4 are turned off and the transistors M2 and M5 are turned on, a charging current flows from the input terminal 2 to the input terminal 3 by way of the power supply line 8, the transistor M2, the capacitor C1, the diode D2, the capacitor C2, the transistor M5 and the power supply line 9, transferring the electric charge accumulated in the capacitor C1 to the capacitor C2 at the next stage by way of the diode D2. In this process, a voltage boosting operation takes place since the transferred electric charge is added to the electric charge already accumulated in the capacitor C2.

(3) When transistors M3 and M4 are turned on and the transistors M2 and M5 are turned off, a charging current flows from the input terminal 2 to the input terminal 3 by way of the power supply line 8, the transistor M4, the capacitor C2, the diode D3, the capacitor C3 the transistor M3 and the power supply line 9, transferring an electric charge accumulated in the capacitor C2 to the capacitor C3 at the next stage by way of the diode D3. Also in this process, a voltage boosting operation takes place since the transferred electric charge is added to the electric charge already accumulated in the capacitor C3.

As a result, the boosted voltage Vo of the voltage booster 1 can be expressed by the following equation.

$$Vo = 3 \cdot (VB - Vf) - Vf - \{(3 \cdot Iout)/C \cdot f)\} + VB \quad (1)$$

where notation Iout denotes an output current, notation f denotes the switching frequency of the gate signals g1 and g2, and notation C denotes the capacitance of each of the capacitors C1 to C4.

The first term of the expression on the right-hand side of equation (1) is a result of the voltage boosting operations (2) and (3) described above, the second term represents a loss caused by a forward-direction voltage drop across the diode D1 and the third term represents a voltage drop caused by the output current Iout. Equation (1) can be further generalized into the following equation (2) given below for a voltage booster having N voltage boosting stages.

$$Vo = N \cdot (V\phi - Vf) - Vf - \{(N \cdot Iout)/C \cdot f)\} + VB \quad (2)$$

where notation V$\phi$ denotes a swing voltage per voltage boosting stage. The swing voltage V$\phi$ is a difference between the first and the second voltages.

In accordance with the equations (1) and (2), the boosted voltage Vo increases proportionally to the number of the voltage boosting stages N and the battery voltage VB (or the swing voltage V$\phi$), but becomes lower as the output current Iout increases or the frequency f decreases.

Here, the comparator 13 employed in the oscillation circuit 10 compares the detection voltage Vb with the switching reference voltage Va all the time. The switching reference voltage Va is set at a level corresponding to a level of 10 V for the battery voltage VB. When the battery voltage VB decreases to a level lower than 10 V, the comparator 13 outputs a low (L) level. When the battery voltage VB increases to a level of at least 10 V, on the other hand, the comparator 13 outputs a high (H) level.

If the comparator 13 outputs the L level, the frequency division circuit 15 sets the frequency division ratio at a small value in order to generate the gate signal g1 having a relatively high frequency f1 (first frequency such as 100 kHz for example). The frequency f1 is set at such a value that, at this frequency f1, it is still possible to exhibit a maximum performance of outputting a boosted voltage Vo of 12 V even if the battery voltage VB decreases to the minimum input voltage of 4.5 V. At such a relatively high frequency f1, steep charging and discharging currents flowing through the capacitors C1 to C4 increase and main higher harmonic components of the frequency f1 are superposed on signals in the radio AM band 530 kHz to 1,620 kHz so that the amount of the radio noise is not reduced. However, a condition in which the battery voltage VB becomes lower than 10 V does not exist in the normal use of the vehicle. Thus, a rising amount of the radio noise has only a small effect on the driver and passengers of the vehicle.

If the comparator 13 outputs the H level, on the other hand, the frequency division circuit 15 sets the frequency division ratio at a large value in order to generate the gate signal g1 having a relatively low frequency f2 (a second frequency such as several tens of kHz for example). The frequency f2 is set at such a value that, at this frequency f2, it is still possible to exhibit a performance of outputting a predetermined boosted voltage Vo of 18 V (=VB+8 V) at a battery voltage VB level of 10 V. At such a relatively low frequency f2, steep charging and discharging currents flowing through the capacitors C1 to C4 decrease and main higher harmonic components of the frequency f2 are shifted from the AM band of a radio mounted on the vehicle to the low-frequency side so that the amount of the radio noise is reduced. In the normal use of the vehicle, the battery voltage VB is higher than 10 V. Thus, in the normal use of the vehicle, the driver and passengers of the vehicle are capable of hearing clear sounds and voices generated by the radio of the vehicle.

It is to be noted that, as the battery voltage VB increases, the boosted voltage Vo also rises, exceeding (VB+8 V). As the boosted voltage Vo almost reaches a level of about (VB+9 V), however, a current flows through the clamp circuit 16 to prevent the boosted voltage Vo from further increasing to an even higher level. Thus, in no case does the boosted voltage Vo exceed withstand levels of components composing the voltage booster 1 and load components such as the transistor M1, which are connected to the output terminal 4.

As described above, the voltage booster 1 implemented in this embodiment detects the battery voltage VB supplied thereto as the input voltage. When the magnitude of the input voltage becomes at least equal to the predetermined threshold level of 10 V, the switching frequency of the transistors M2 to M7 is lowered to reduce the driving performance of the driving circuit 7. It is therefore possible to decrease the amount of noise radiated from the voltage booster 1 to the external side. In addition, since the frequency band of the noise is shifted to a low frequency side, main higher harmonic components of the noise can be excluded from the AM band of the radio. As a result, the voltage booster 1 exhibits a great effect of reducing the amount of the radio noise.

Instead of eliminating generated noise, the voltage booster 1 suppresses the noise generation itself. Thus, it is not necessary to add the traditionally used filter comprising a reactor and a capacitor. As a result, it is possible to reduce the size and the cost of the voltage booster 1. In addition, if the voltage boosting performance is not sufficient due to an input voltage lower than 10 V, the switching frequency of the transistors M2 to M7 is raised to make it possible to output a boosted voltage Vo at the predetermined level of (VB+8 V).

In addition, by changing the driving performance of the driving circuit 7 from one of the 2 stages to another or by eliminating the components of the filter as described above, the magnitude of a power loss incurred by the voltage booster 1 can be reduced so that it is possible to exhibit the effect of an increased efficiency in comparison with the conventional voltage booster. Furthermore, new circuits added to the conventional configuration have small sizes allowing the circuits to be each implemented as an IC or discrete components. Since such ICs or discrete components can be added with ease to the conventional configuration, changes can be made easily to the circuit of the conventional configuration. In addition to the voltage detection circuit 12, the new circuits include the comparator 13 and the frequency division circuit 15, which are employed in the oscillation circuit 10.

Since all transistors employed in the driving circuit 7 of this embodiment are N-channel MOS transistors, the driving circuit 7 offers merits of a small chip area and small transistor resistances. In addition, since a voltage boosted by the driving circuit 7 itself is used as a gate voltage, it is not necessary to provide a voltage boosting circuit separately. As a result, the circuit configuration can be made simple.

Second Embodiment

Figure 3:
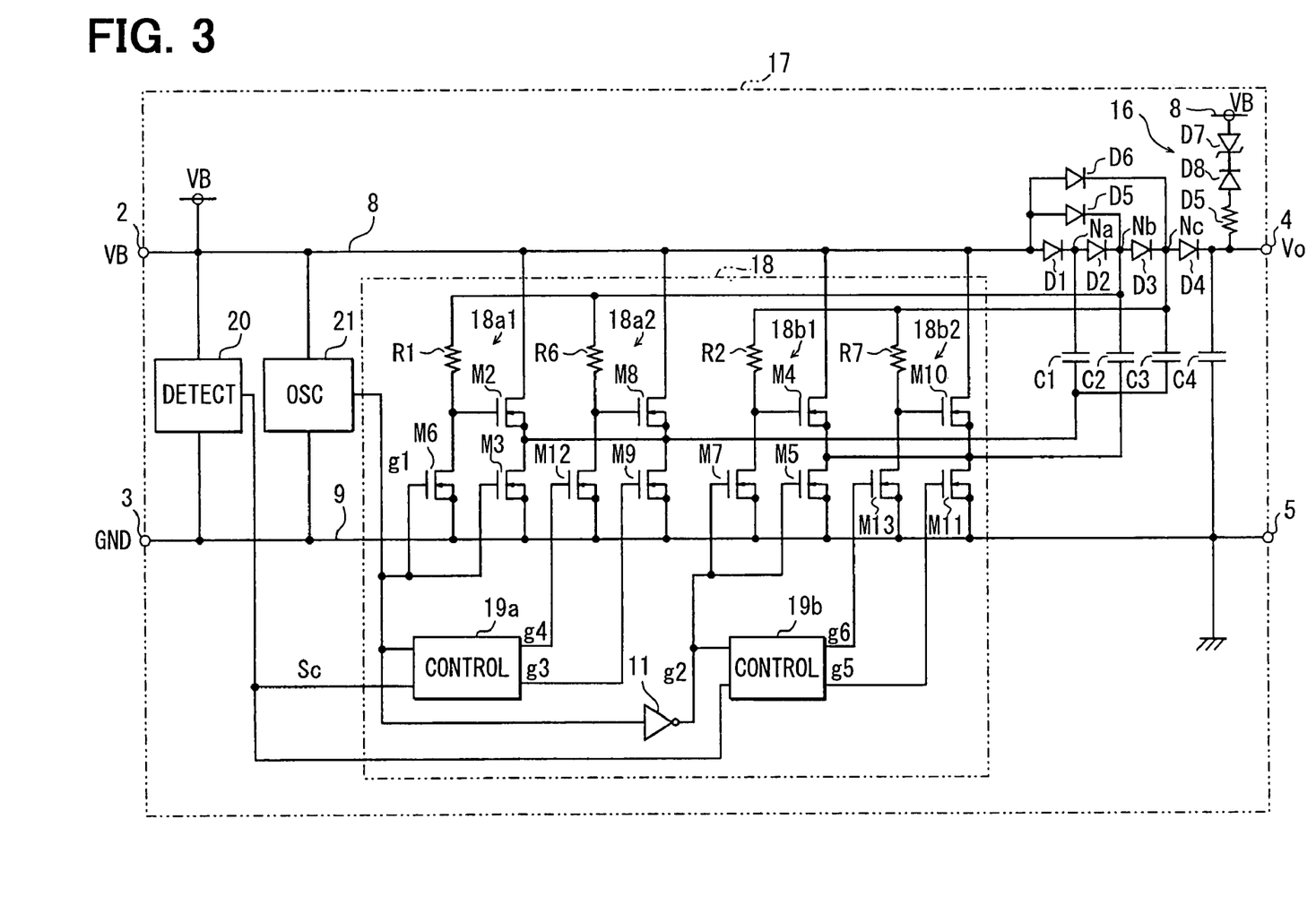
FIG. 3 is a circuit diagram showing the electrical configuration of a voltage booster implemented as a second embodiment of the present invention.
Figure 4:
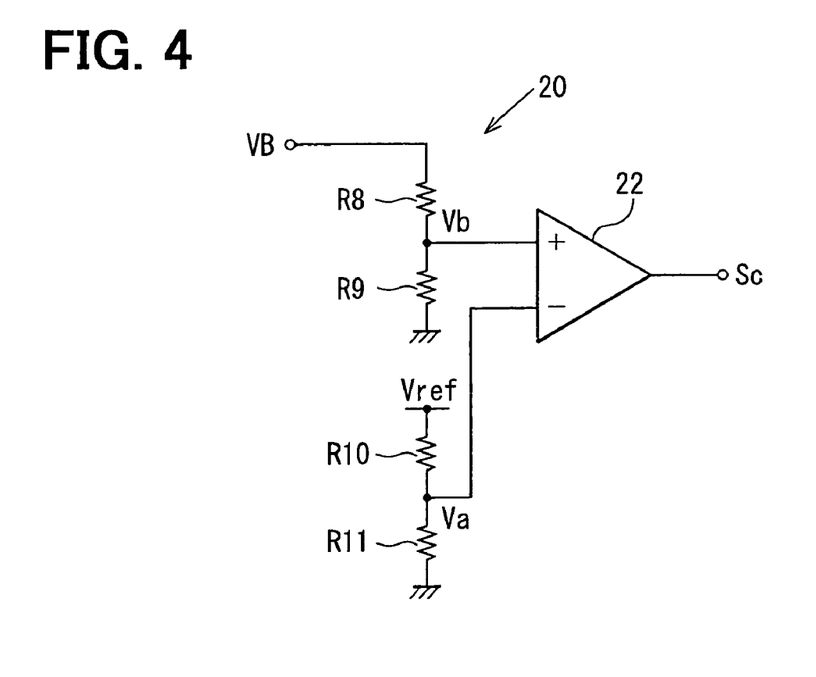
FIG. 4 is a circuit diagram showing the electrical configuration of a voltage detection circuit employed in the second embodiment.

In a second embodiment shown in FIGS. 3 and 4, a voltage booster 17 has a similar configuration as the voltage booster 1 shown in FIG. 1. However, a driving circuit 18 employed in the voltage booster 17 has driving circuits 18a1 and 18a2 for driving other terminals of the capacitors C1 and C3. The driving circuit 18 also has driving circuits 18b1 and 18b2 for driving the other terminal of the capacitor C2. The driving circuits 18a1 and 18b1 are respectively identical with the partial driving circuits 7a and 7b shown in FIG. 1.

The driving circuit 18a2 has a circuit configuration similar to the driving circuit 18a1. Specifically, the driving circuit 18a2 comprises transistors M8 and M9 connected in series between the power supply lines 8 and 9, a transistor M12 connected between the gate of the transistor M8 and the power supply line 9 and a resistor R6 connected between the gate of the transistor M8 and the node Nb. Similarly, the driving circuit 18b2 comprises transistors M10 and M11 connected in series between the power supply lines 8 and 9, a transistor M13 connected between the gate of the transistor M10 and the power supply line 9 and a resistor R7 connected between the gate of the transistor M10 and the node Nc.

A driving control circuit 19a for a driving performance adjustment passes on the gate signal g1 with the signal level thereof unchanged to the transistor M9 as a gate signal g3 and to the transistor M12 as a gate signal g4 when a switching signal Sc received from a voltage detection circuit 20 is set at the L level. When the switching signal Sc is set at the H level, on the other hand, the driving control circuit 19a forcibly sets the gate signal g3 supplied to the transistor M9 at the L level and the gate signal g4 supplied to the transistor M12 at the H level.

Similarly, a driving control circuit 19b for driving performance adjustment passes on the gate signal g2 with the level thereof unchanged to the transistor M11 as a gate signal g5 and to the transistor M13 as a gate signal g6 when a switching signal Sc received from a voltage detection circuit 20 is set at the L level. When the switching signal Sc is set at the H level, on the other hand, the driving control circuit 19b forcibly sets the gate signal g5 supplied to the transistor M11 at the L level and the gate signal g6 supplied to the transistor M13 at the H level.

An oscillation circuit 21 includes a CR oscillation circuit having a fixed oscillation frequency of typically 100 kHz. As shown in FIG. 4, the voltage detection circuit 20 comprises resistors R8, R9, R10 and R11 as well as a comparator 22. The resistors R8 and R9 form a voltage divider for dividing the voltage VB supplied between the input terminals 2 and 3 to generate a detection voltage Vb. On the other hand, the resistors R10 and R11 form a voltage divider for dividing the reference voltage Vref to generate a switching reference voltage Va. The comparator 22 compares the detection voltage Vb with the switching reference voltage Va.

Switching frequencies of this embodiment and the sizes of the transistors M2 to M13 are each set at a value that satisfies a driving performance (voltage boosting characteristic). By adjusting the transistor sizes and other transistor characteristics, for example, it is possible to set the driving performances of the driving circuits 18a1, 18a2, a8b1 and 18b2 at desired values. In addition, it is also possible to set the ratio of the performance of the driving circuit 18a1 to the performance of the driving circuit 18a2 and the ratio of the performance of the driving circuit 18b1 to the performance of the driving circuit 18b1 at a desired value.

In operation, when the battery voltage VB serVBg as the input voltage to the voltage booster 17 decreases to a level below 10 V, the voltage detection circuit 20 outputs the switching signal Sc at the L level. In this case, the gate signal g1 is supplied to the gates of the transistors M3, M6, M9 and M12. The gate signal g2 is supplied to the gates of the transistors M5, M7, M11 and M13. Thus, the driving circuit 18a1 operates concurrently with the driving circuit 18a2, whereas the driving circuit 18b1 operates concurrently with the driving circuit 18b2, carrying out an operation to accumulate electric charges in the capacitors C1 to C3 at the maximum driving performance. As a result, larger charging currents can be flown so that it is possible to output a boosted voltage Vo of 12 V even if the battery voltage VB decreases to the minimum input voltage of 4.5 V.

When the battery voltage VB increases to a level of at least 10 V, on the other hand, the voltage detection circuit 20 outputs the switching signal Sc at the H level. In this case, the transistors M8, M9, M10 and M11 are turned off causing the driving circuits 18a2 and 18b2 to cease from operating. That is, only the driving circuits 18a1 and 18b1 each operate as a single driving circuit. Thus, an operation is carried out to accumulate electric charges in the capacitors C1 to C3 at a driving performance lower than the maximum driving performance. With this relatively low driving performance, however, it is possible to output the predetermined boosted voltage Vo of 18 V (=VB+8 V) at a battery voltage VB of 10 V.

As is obvious from the above description, the second embodiment has two modes. In one of the two modes, the driving circuit 18a1 operates concurrently with the driving circuit 18a2, whereas the driving circuit 18b1 operates concurrently with the driving circuit 18b2. In the other mode, the driving circuits 18a1 and 18b1 each operate as a single driving circuit. The second embodiment switches the mode from one to the other in order to adjust the driving performance of the driving circuit 18 in accordance with the input battery voltage VB. Thus, it is possible to output the predetermined boosted voltage Vo almost equal to (VB+8 V) provided that the battery voltage VB is at least equal to the minimum input voltage of 4.5 VB addition, when the battery voltage VB increases, the charging/discharging currents flowing through the capacitors C1 to C3 are suppressed to reduce the amount of generated noise. As a result, much like the first embodiment, the second embodiment also offers the merits such as a small size, a low cost and a high efficiency.

Third Embodiment

Figure 5:
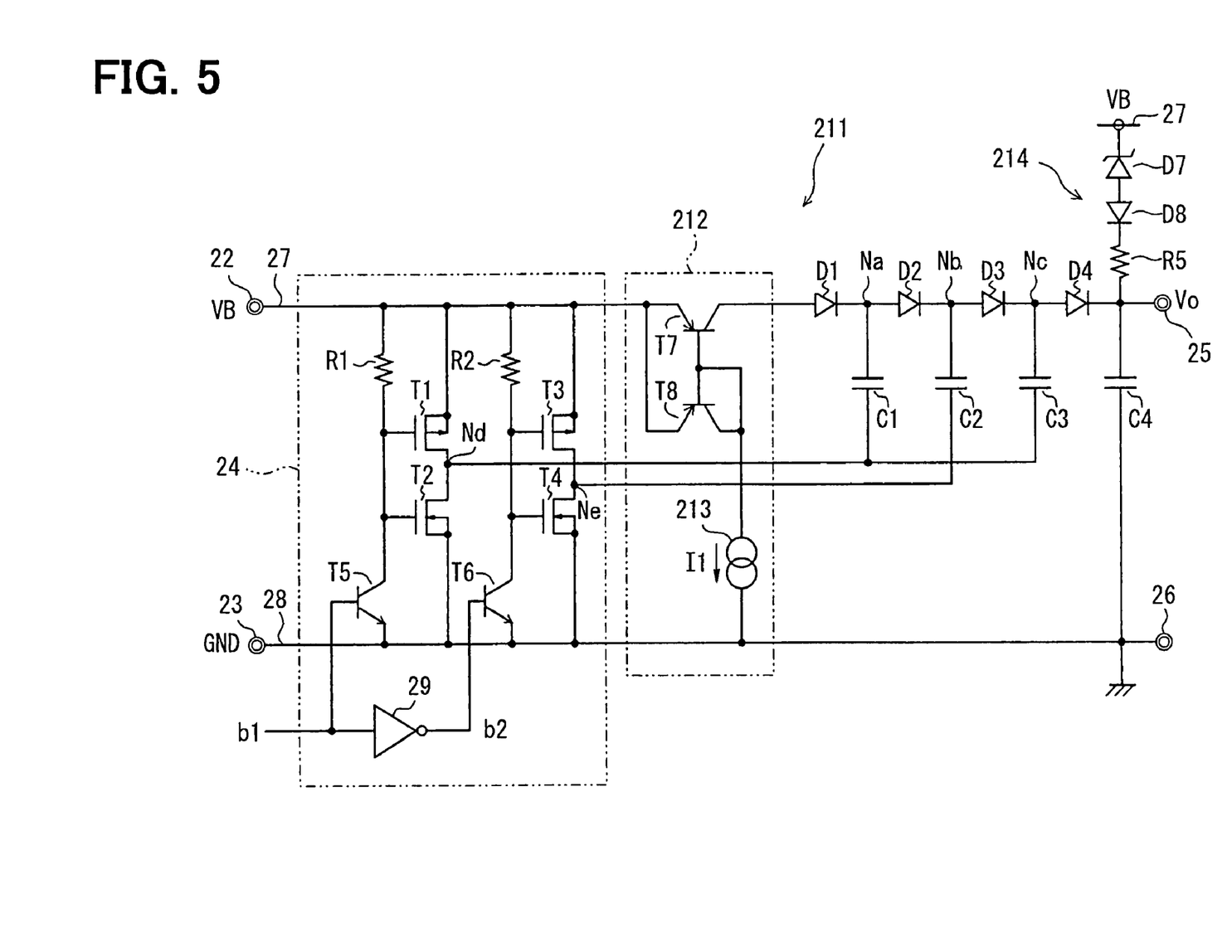
FIG. 5 is a circuit diagram showing the electrical configuration of a voltage booster implemented as a third embodiment of the present invention.
Figure 6A:
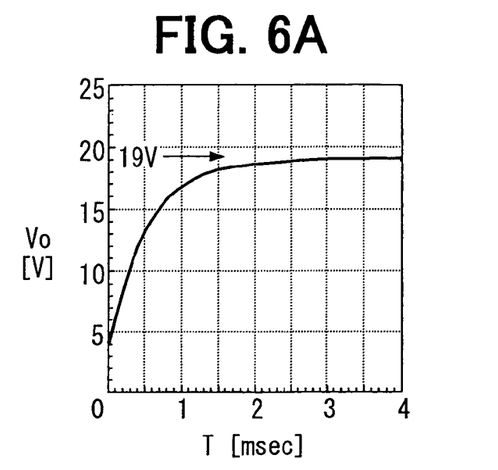
FIGS. 6A to 6C are operation diagrams showing simulation waveforms of an output voltage and input currents as waveforms observed at the start of a voltage boosting operation in the third embodiment.
Figure 6B:
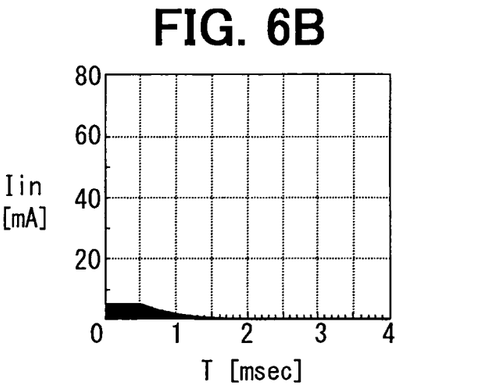
Figure 6C:
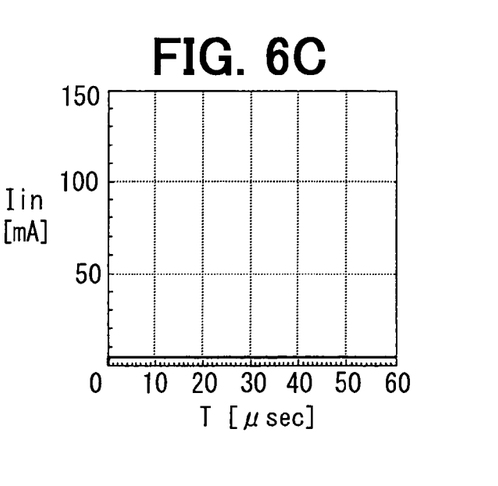
Figure 7A:
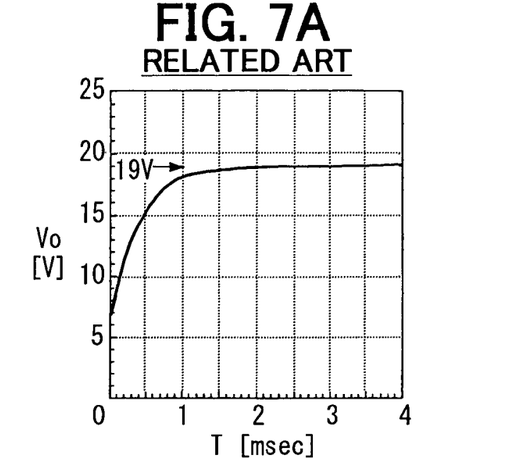
FIGS. 7A to 7C are operation diagrams showing simulation waveforms of an output voltage and input currents of the conventional configuration as waveforms observed at the start of a voltage boosting operation to be compared with those shown in FIGS. 6A to 6C.
Figure 7B:
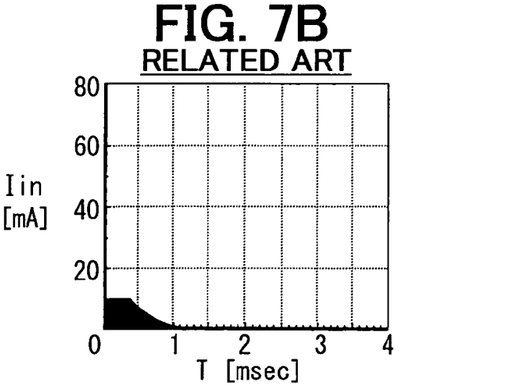
Figure 7C:
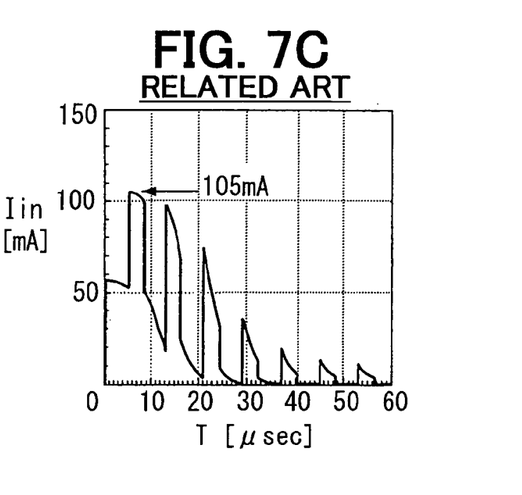

In a third embodiment shown in FIGS. 5 to 7, a voltage booster 211 is employed typically in an electronic control apparatus mounted on a vehicle as a circuit for generating the gate voltage of an N-channel MOS transistor (M1 in FIG. 1) functioning as a high-side switch, although not shown in FIG. 5. Components of the voltage booster 211 except capacitors C1 to C4 compose a portion of a control IC also not shown in the figure. However, it is also possible to provide a configuration in which the capacitors C1 to C4 are also embedded in the control IC.

A typical voltage VB of 12 V generated by a battery (not shown) is supplied from a positive-electrode terminal and negative-electrode terminal of the battery to respectively a voltage input terminal 22 and input terminal 23 of the voltage booster 211 by way of typically an ignition switch (not shown). The voltage booster 211 has a voltage boosting performance for generating a boosted voltage of (VB+8V) where VB is an input voltage actually supplied to the voltage booster 211 and outputting the boosted voltage Vo to a voltage output terminal 25 as an output voltage Vo.

The input terminal 22 and the output terminal 25 are linked to each other by diodes D1, D2, D3 and D4, which are connected to each other in series by orienting the anodes of all the diodes D1, D2, D3 and D4 to the input terminal 22. In FIG. 5, Na denotes the common junction point between the diodes D1 and D2, Nb denotes the common junction point between the diodes D2 and D3, and Nc denotes the common junction point between the diodes D3 and D4. The nodes Na, Nb and Nc are connected to ones of the terminals of capacitors C1, C2 and C3, respectively. Two different voltages (that is, the input voltage VB and a 0V voltage), which are generated by a driving circuit 24, are supplied as alternating voltages to the other terminal of each of the capacitors C1, C2 and C3, alternately. It is to be noted that a smoothing capacitor C4 is connected between the output terminal 25 and a ground output terminal 26.

The driving circuit 24, which is employed in the voltage booster 211, has the following configuration. A P-channel MOS transistor T1 and an N-channel MOS transistor T2 are connected to each other in series between a power supply line 27 wired to the input terminal 22 and a power supply line (ground line) 28 wired to the input terminal 23. Similarly, a P-channel MOS transistor T3 and an N-channel MOS transistor T4 are connected to each other in series between the power supply line 27 and the power supply line 28. A common junction point Nd between the drains of the transistors T1 and T2 is connected to the other terminals of the capacitors C1 and C3. On the other hand, a common junction point Ne between the drains of the transistors T3 and T4 is connected to the other terminal of the capacitor C2.

A resistor R1 and an NPN transistor T5 are connected to each other in series between the power supply line 27 and the power supply line 28. A common junction point between the resistor R1 and the NPN transistor T5 is connected to the bases of the transistors T1 and T2. Similarly, a resistor R2 and an NPN transistor T6 are connected to each other in series between the power supply line 27 and the power supply line 28. A common junction point between the resistor R2 and the NPN transistor T6 is connected to the bases of the transistors T3 and T4.

A base signal b1 generated by an oscillation circuit not shown in the figure as a signal having a rectangular waveform is supplied to the base of the transistor T5. On the other hand, a base signal b2 generated by an inverter 29 as the inverted signal of the base signal b1 is supplied to the base of the transistor T6. The transistors T1 to T4 serVBg as switching devices in the driving circuit 24 are each a power MOSFET having a high withstand voltage.

On the power supply line 27 connecting the input terminal 22 to the diode D1, a constant current circuit (current regulation circuit) 212 is provided, being connected in series with respect to the diode D1. The constant current circuit 212 includes a PNP transistor (first transistor) T7 inserted into the power supply line 27. Specifically, the emitter of the transistor T7 is connected to a node for supplying a current from the power supply line 27 to the driving circuit 24, and the collector thereof is connected to the anode of the diode D1. The constant current circuit 212 also has a PNP transistor (second transistor) T8 composing a current mirror circuit in conjunction with the transistor T7. In addition, the constant current circuit 212 includes a constant current generator 213 connected between the collector of the transistor T8 and the power supply line 28.

Since the voltage booster 211 executes open loop control for the boosted voltage Vo, it is likely that the input voltage VB causes the boosted voltage Vo to increase to an excessively high level. In order to solve this problem, a clamp circuit 214 is connected between the power supply line 27 and the output terminal 25. The clamp circuit 16 comprises an 8V Zener diode D7, a diode D8 and a resistor R5.

In operation, when the battery voltage VB is applied between the input terminals 22 and 23 by, for example, turning on an ignition switch of the vehicle, the constant current circuit 212 including the constant current generator 213 functions. At that time, a fixed charging current of typically 5 mA flows from the input terminal 22 to the diode D1 by way of the constant current circuit 212. Thus, no surging current flows.

In the driving circuit 24, a left-side portion including the transistors T1, T2 and T5 operating in accordance with the base signal b1 works complementarily to a right-side portion including the transistors T3, T4 and T6 operating in accordance with the base signal b2, which is the inverted signal of the base signal b1. When the transistor T5 is turned on, the transistor T1 is also turned on but the transistor T2 is turned off. When the transistor T5 is turned off, on the other hand, the transistor T1 is also turned off but the transistor T2 is turned on. Similarly, when the transistors T3, T4 and T6 operate in the same way as the transistors T1, T2 and T5 respectively. That is, the transistor T2 operates complementarily to the transistor T1, while the transistor T4 operates complementarily to the transistor T3.

After the base signal b1 is applied to the driving circuit 24, operations described below are carried out. It is to be noted that, in the following description, the input voltage (battery voltage) VB and the ground voltage correspond to first and second voltages, respectively. In addition, operations (1) and (3) are carried out concurrently with operations (2) and (4), respectively.

(1) When the transistors T2 and T3 are turned on and the transistors T1 and T4 are turned off, a charging current flows from the input terminal 22 to the input terminal 23 by way of the power supply line 27, the constant current circuit 212, the diode D1, the capacitor C1, the transistor T2 and the power supply line 28, accumulating an electric charge in the capacitor C1.

(2) When the transistors T2 and T3 are turned off and the transistors T1 and T4 are turned on, a charging current flows from the input terminal 22 to the input terminal 23 by way of the power supply line 27, the transistor T1, the capacitor C1, the diode D2, the capacitor C2, the transistor T4 and the power supply line 28, transferring the electric charge accumulated in the capacitor C1 to the capacitor C2 at the next stage by way of the diode D2. In this process, a voltage boosting operation takes place, since the transferred electric charge is added to an electric charge already accumulated in the capacitor C2.

(3) When the transistors T2 and T3 are turned on and the transistors T1 and T4 are turned off, a charging current flows from the input terminal 22 to the input terminal 23 by way of the power supply line 27, the transistor T3, the capacitor C2, the diode D3, the capacitor C3, the transistor T2 and the power supply line 28, transferring the electric charge accumulated in the capacitor C2 to the capacitor C3 at the next stage by way of the diode D3. In this process, a voltage boosting operation also takes place since the transferred electric charge is added to an electric charge already accumulated in the capacitor C3.

(4) When the transistors T2 and T3 are turned off and the transistors T1 and T4 are turned on, a charging current flows from the input terminal 22 to the input terminal 23 by way of the power supply line 27, the transistor T1, the capacitor C3, the diode D4, the capacitor C4 and the power supply line 28, transferring the electric charge accumulated in the capacitor C3 to the capacitor C4 at the next stage by way of the diode D4. In this process, a voltage boosting operation also takes place since the transferred electric charge is added to an electric charge already accumulated in the capacitor C4.

As a result, the boosted voltage Vo of the voltage booster can be expressed by the following equation (3).

$$Vo = 2 \cdot (VB - Vf) - 2 \cdot Vf - ((2 \cdot Io)/C \cdot f)) + VB \quad (3)$$

Notation Io denotes an output current, notation f denotes the frequency (pumping frequency) of the base signals b1 and b2, notation Vf denotes a forward-direction voltage drop across each of the diodes D1 to D4, whereas notation C denotes the capacitance of each of the capacitors C1 to C4.

The first and fourth terms of the expression on the right-hand side of equation (3) are results of the voltage boosting operations (2), (3) and (4) described above, the second term represents a loss caused by forward-direction voltage drops across the diode D1 and D4, whereas the third term represents a voltage drop caused by the output current Io. Equation (3) can be further generalized into equation (4) given below for a voltage booster having N voltage boosting stages as follows.

$$Vo = N \cdot (V\phi - Vf) - 2 \cdot Vf - ((N \cdot Io)/C \cdot f)) + VB \quad (4)$$

Notation Vφ denotes a swing voltage per voltage boosting stage.

In this case, a constant current value I1 (corresponding to a controlled-current value Im) of the constant current circuit 212 is expressed by the following equation (5).

$$I1 \geq C \cdot V1 \cdot f \quad (5)$$

Notation V1 (=VB−Vf) denotes an accumulated-charge voltage of the capacitor C1 in a steady state.

By determining the constant current value I1 as described above, the voltage booster 211 can be provided with a sufficient voltage boosting performance even at the start of a voltage boosting operation.

FIGS. 6A to 6C and FIGS. 7A to 7C are diagrams showing simulation waveforms of the output voltage Vo and the input current Iin, which appear at the start of a voltage boosting operation. Specifically, FIGS. 6A to 6C are diagrams showing simulation waveforms of the output voltage Vo and the input current Iin of the voltage booster 211, while FIGS. 7A to 7C are diagrams showing simulation waveforms of the output voltage Vo and the input current Iin of a pump charge circuit according to a related art, which does not include a current regulation circuit.

To be more specific, FIGS. 6A and 7A are each a diagram showing the simulation waveform of the output voltage Vo, FIGS. 6B and 7B are each a diagram showing the simulation waveform of the input current Iin whereas FIGS. 6C and 7C are each a diagram also showing the simulation waveform of the input current Iin with the time (T) axis extended. Simulation conditions are set as follows.

Pumping frequency f=120 kHz
Capacitance C of capacitors C1 to C4=0.1 microfarads
Input voltage VB (battery voltage VB)=6 V
Output current Io=0 A Comparison of FIGS. 6A to 6C with FIGS. 7A to 7C indicates that, in the case of the pump charge circuit having no current regulation circuit, a steep input current Iin up to 105 mA flows through a voltage supply line for supplying a voltage generated by a battery to the pump charge circuit, generating noise with a large amount. In general, an electric potential appearing between terminals of each of the voltage boosting capacitors C1 to C3 employed in the voltage booster greatly varies. Unlike other circuit components fixed at the ground electric potential, the terminals of each of the capacitors C1 to C3 thus tend to generate noise with a large amount, raising a noise problem. In this case, if the pumping frequency f is set at a value of the order of 120 kHz, main higher harmonic components of the frequency f are superposed on signals in the radio AM band 530 kHz to 1,620 kHz, inevitably increasing the amount of the radio noise.

In the case of the voltage booster 211 implemented by this embodiment, on the other hand, the magnitude of the input current Iin is fixed at 5 mA all the time. Thus, the amount of generated noise can be greatly suppressed. It is to be noted that, as is obvious from comparison of FIG. 6A with FIG. 7A, the voltage booster 211 employing the constant current circuit 212 shows a tendency to raise the output voltage Vo more slowly than the charge pump according to the related art to a certain degree. However, the slower rise of the output voltage Vo is not considered to be a cause of a problem in the practical use of the voltage booster 211.

As described earlier, the voltage booster 211 implemented in this embodiment includes the constant current circuit 212 connected in series with the diode D1 to the power supply line 27 serving as a path for supplying a charging current to the voltage boosting capacitor C1. It is thus possible to control the magnitude of a charging current, which flows from the input terminal 22 to the capacitor C1 to accompany operations to switch the transistors T1, T2, T3, T4 and T5 composing the driving circuit 24, to the constant current value I1.

In addition, it is also possible to control an inrush current flowing to the capacitors C1 to C4 through the diodes D1 to D4 at a power-on time. As a result, it is possible to control a current flowing from a battery to the power supply line 27 connected to the input terminal 22 and, hence, reduce the amount of noise radiated from the voltage booster 211 to the external side. This embodiment, which is employed in an electronic control apparatus mounted on a vehicle, is expected to exhibit an effect of improving a bad condition caused by radiation of the radio noise.

Instead of eliminating generated noise, the voltage booster 211 suppresses the noise generation itself. Thus, it is not necessary to add the traditionally used filter comprising a reactor and a capacitor. As a result, it is possible to reduce the size and the cost of the voltage booster 211. In addition, by eliminating the components composing the filter, it is possible to decrease the magnitude of a power loss incurred by the voltage booster 211. As a result, an effect to increase the efficiency over the conventional voltage booster is realized.

Furthermore, the constant current value I1 of the constant current circuit 212 is set at a value satisfying the expression represented by equation (5) given above. Thus, the voltage booster 211 can have a sufficient voltage boosting performance even if a load borne at the start of a voltage boosting operation increases.

Fourth Embodiment

Figure 8:
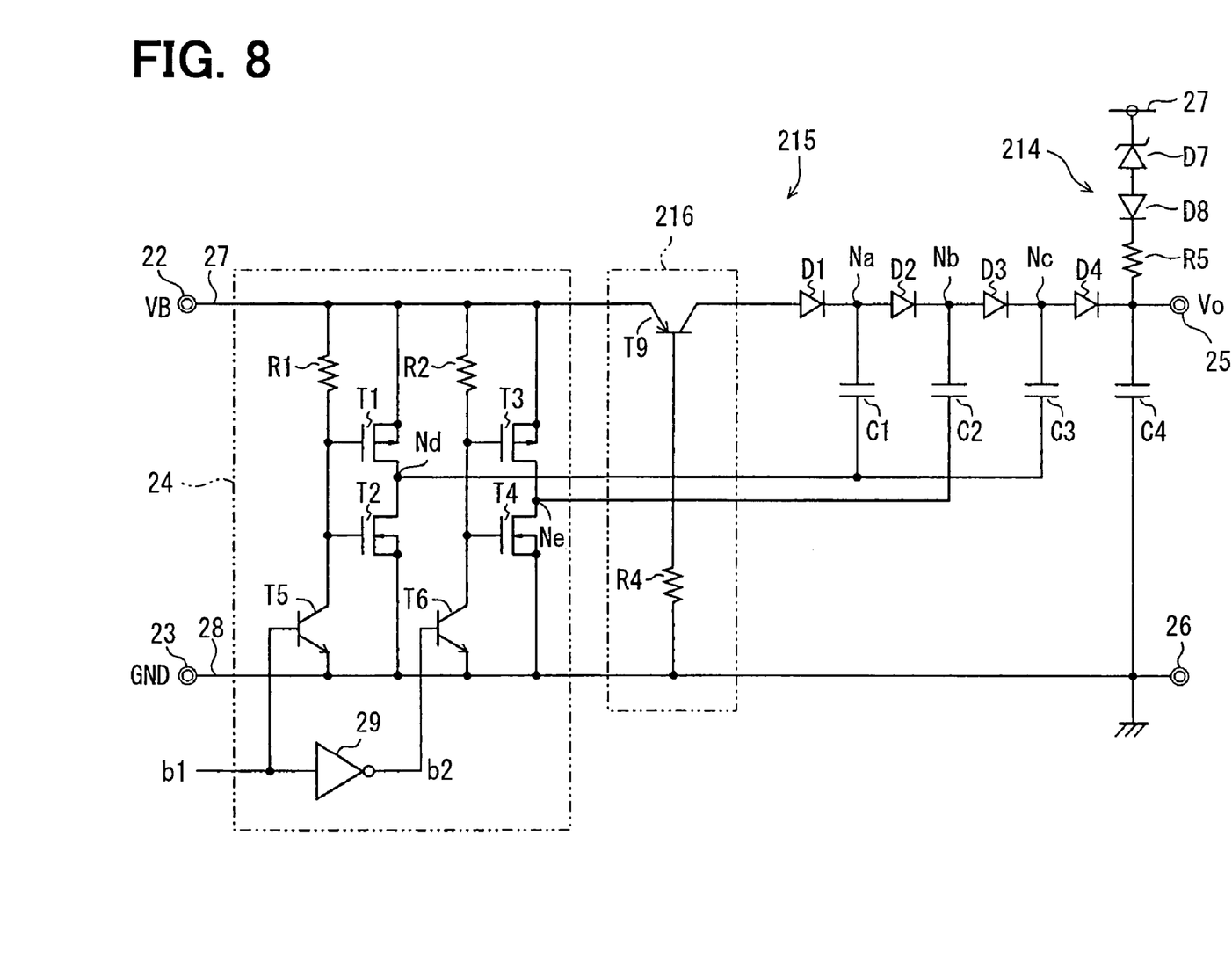
FIG. 8 is a circuit diagram showing the electrical configuration of a voltage booster implemented as a fourth embodiment of the present invention.
Figure 9A:
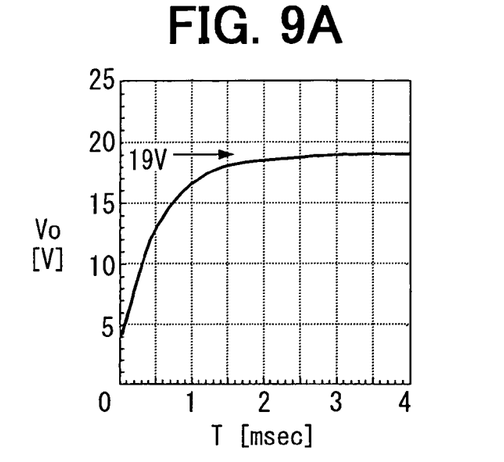
FIGS. 9A to 9C are operation diagrams showing simulation waveforms of an output voltage and input currents as waveforms observed at the start of a voltage boosting operation in the fourth embodiment.
Figure 9B:
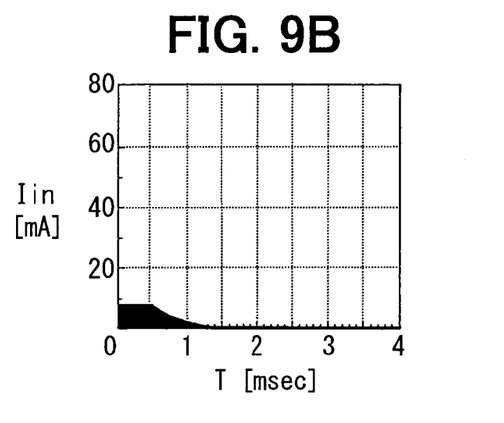
Figure 9C:
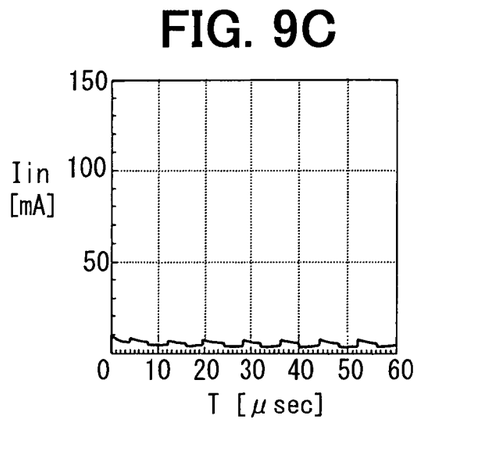
Figure 10A:
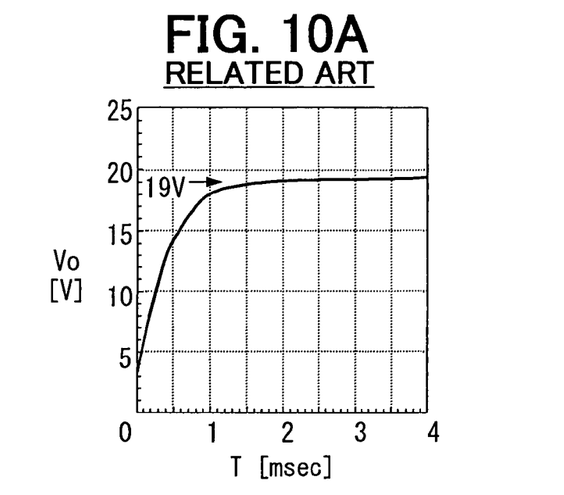
FIGS. 10A to 10C are operation diagrams to be compared with those of FIGS. 9A to 9C.
Figure 10B:
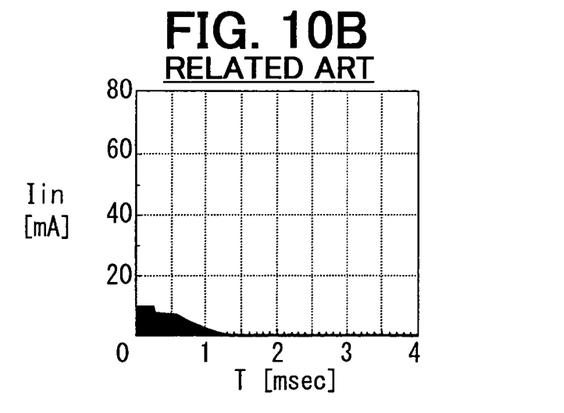
Figure 10C:
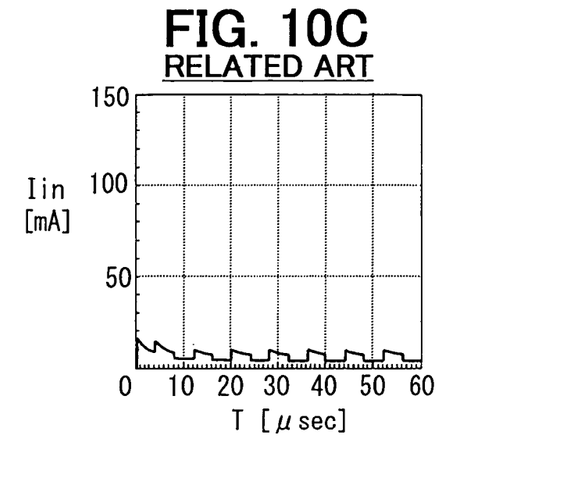

In a fourth embodiment shown in FIGS. 8 to 10, a voltage booster 215 has a different configuration of the current regulation circuit. A current limiting circuit 216 also provided on the power supply line 27 connecting the input terminal 22 to the diode D1, being connected in series with respect to the diode D1 comprises a PNP transistor T9 and a resistor R4. The transistor T9 is inserted into the voltage booster 215 at the same connection location as the transistor T7 shown in FIG. 5. The resistor R4 connects the base of the transistor T9 to the power supply line 28.

A limited current Ilmt generated by the current limiting circuit 216 is expressed by the following equation (6).

$$Ilmt = hFE(T9) \cdot (VB - Vf)/R4 \quad (6)$$

Notation hFE (T9) denotes the DC current amplification factor of the transistor T9. The limited current Ilmt is also set at a value satisfying the expression represented by the equation (5).

FIGS. 9A to 9C and FIGS. 10A to 10C are diagrams showing simulation waveforms of the output voltage Vo and the input current Iin, which appear at the start of a voltage boosting operation. Specifically, FIGS. 9A to 9C are diagrams showing simulation waveforms of the output voltage Vo and the input current Iin for a transistor T9 constructed as a single transistor. FIGS. 10A to 10C are diagrams showing simulation waveforms of the output voltage Vo and the input current Iin for a transistor T9 constructed as two transistor cells forming a parallel circuit.

More specifically, the waveforms shown in FIGS. 9A to 9C and FIGS. 10A to 10C are the waveforms of the output voltage Vo and the input current Iin much like FIGS. 6A to 6C. In addition, the simulation conditions are the same as those of the third embodiment. As is obvious from FIGS. 9A to 9C and 10A to 10C, since the input current Iin is limited to values smaller than 10 mA and 15 mA, respectively, the amount of noise is reduced greatly in comparison with the voltage booster according to the related art. It is to be noted that, since the value of the limited current Ilmt of a transistor T9 constructed as 2 transistor cells forming a parallel circuit is greater than the value of the limited current Ilmt of a transistor T9 constructed as a single transistor, the rise time of the output voltage Vo for a transistor T9 constructed as two transistors is somewhat shorter.

As described above, the voltage booster 215 implemented in this embodiment includes the current limiting circuit 216 connected in series with the diode D1 to the power supply line 27 serving as a path for supplying a charging current to the voltage boosting capacitor C1. It is thus possible to control the magnitude of a charging current, which flows from the input terminal 22 to the capacitor C1, to the limited current Ilmt much like the third embodiment. As a result, it is possible to obtain the same effect as the third embodiment. In addition, since the current limiting circuit 216 can be constructed to comprise only the transistor T9 and the resistor r4, the fourth embodiment has a merit of a simple circuit configuration.

Fifth Embodiment

Figure 11:
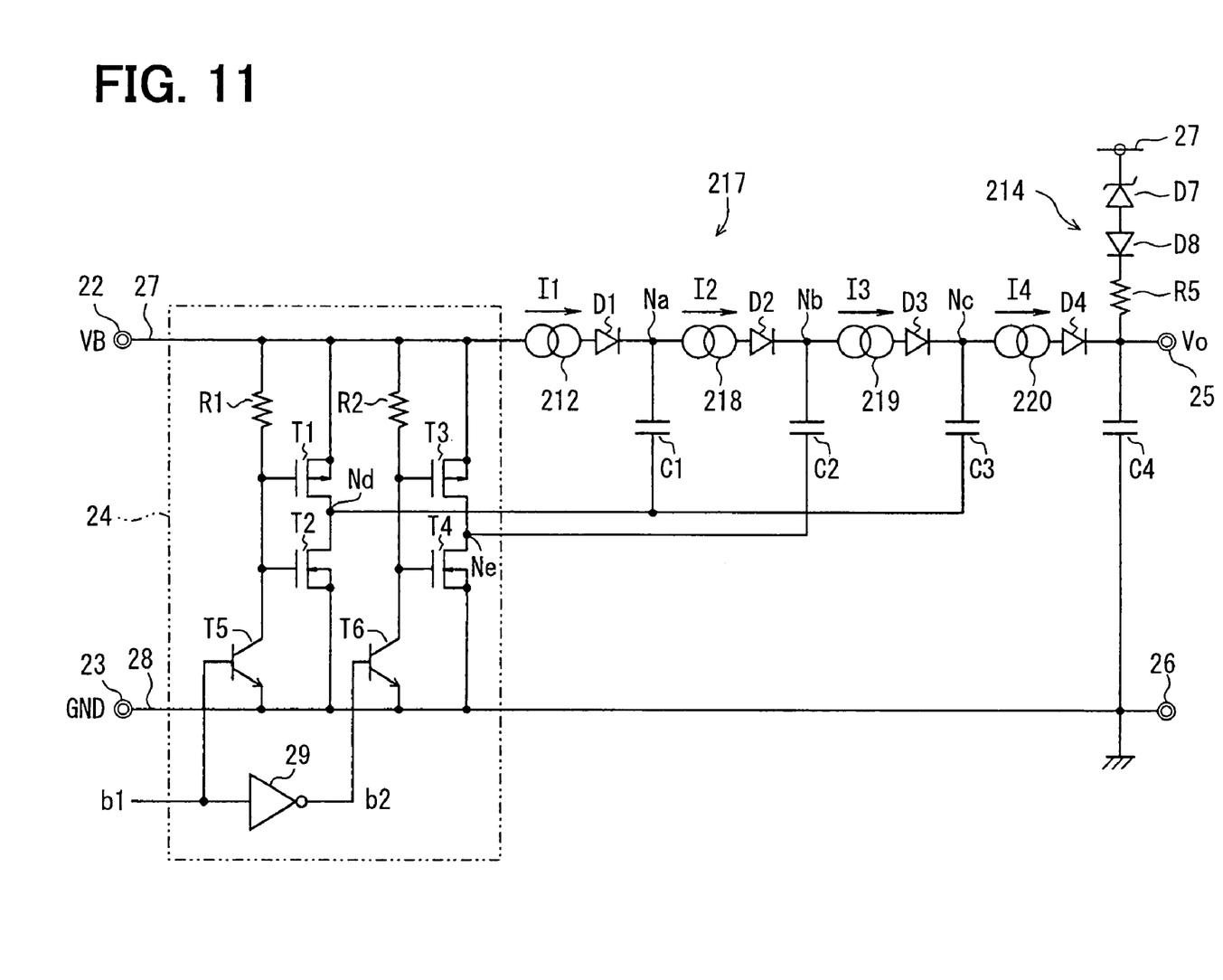
FIG. 11 is a circuit diagram showing the electrical configuration of a voltage booster implemented as a fifth embodiment of the present invention.

In a fifth embodiment shown in FIG. 11, a voltage booster 217 is characterized by constant current circuits 212, 218, 219 and 220 (each corresponding to a current regulation circuit) connected in series with respect to the diodes D1, D2, D3 and D4, respectively. The constant current circuits 218, 219 and 220 each have the same configuration as the constant current circuit 212. However, constant currents I2, I3 and I4 generated by the constant current circuits 218, 219 and 220 respectively may be uniform or different from each other. The constant currents I1, I2, I3 and I4 are each set at a value, which is as small as possible but within a range providing a sufficient voltage boosting performance for the voltage boosting stage of the diode receiving the constant current.

In the case of the configuration with a constant current circuit provided for each voltage boosting stage, in operations (1) to (4) explained for the third embodiment, charging currents are controlled as follows.

In operation (1), a charging current flowing to the capacitor C1 is controlled by the constant current circuit 212. In operation (2), a charging current flowing to the capacitors C1 and C2 is controlled by the constant current circuit 218. In operation (3), a charging current flowing to the capacitors C2 and C3 is controlled by the constant current circuit 219. In operation (4), a charging current flowing to the capacitors C3 and C4 is controlled by the constant current circuit 220.

In accordance with the voltage booster 217 implemented in the fourth embodiment, currents flowing to the capacitors C1 to C4 can be controlled individually. It is thus possible to suppress electromagnetic noise radiated from, for example, leads connecting the capacitors C1 to C4 to a control IC as components external to the IC.

Sixth Embodiment

Figure 12:
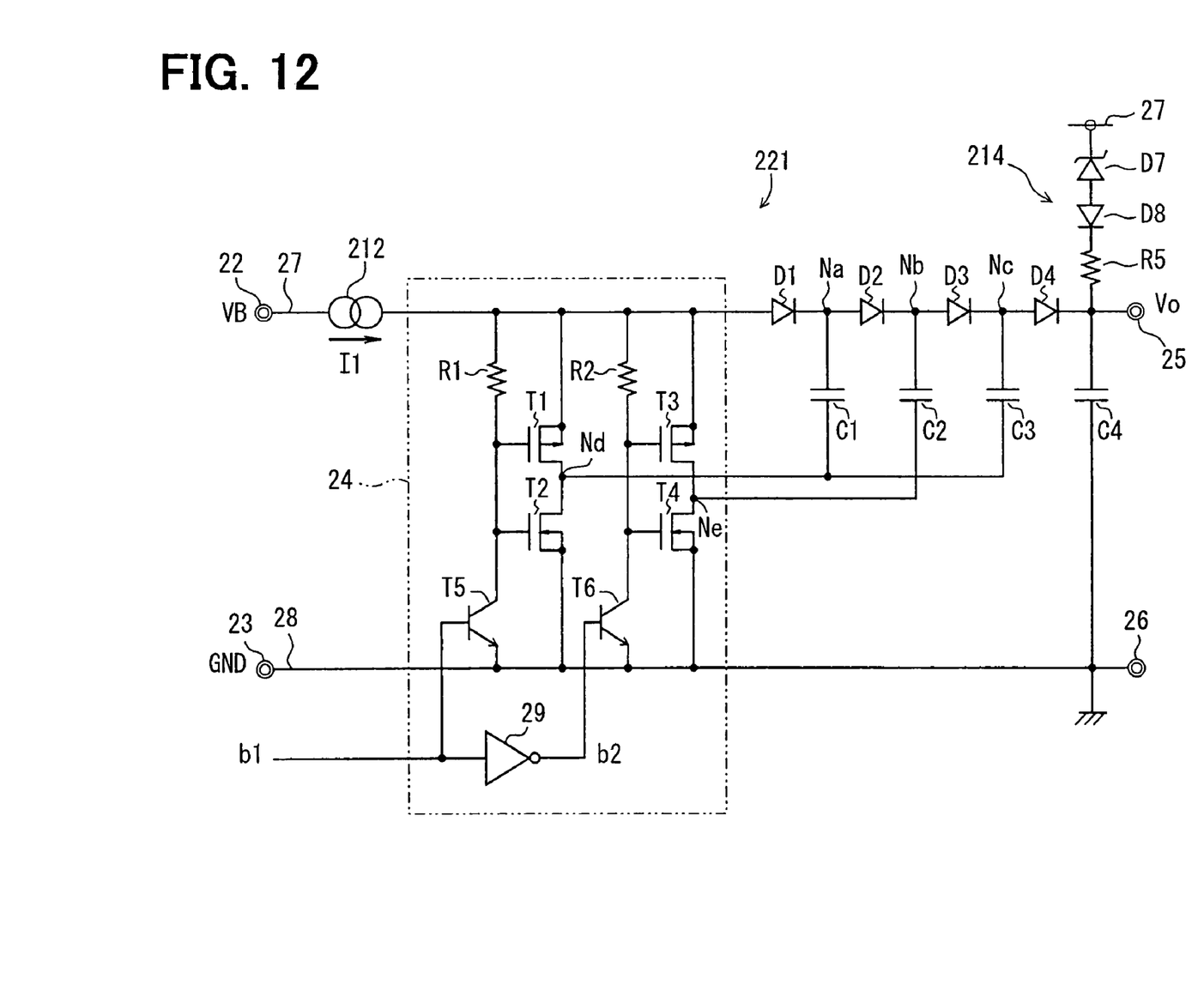
FIG. 12 is a circuit diagram showing the electrical configuration of a voltage booster implemented as a sixth embodiment of the present invention.

In a sixth embodiment shown in FIG. 12, a voltage booster 221 is different from the voltage booster 211 shown in FIG. 5 in that the voltage booster 221 includes the constant current circuit 212 connected at a different place. Specifically, in the voltage booster 221, the constant current circuit 212 is inserted into the power supply line 27, being connected to a current path for supplying a current from the input terminal 22 to the driving circuit 24 and the diode D1. Thus, the constant current value I1 in the voltage booster 221 is set at a value by considering the fact that the constant current value I1 includes not only a sufficient sub-current flowing to the capacitor C1 by way of the diode D1, but also a sufficient sub-current flowing to the capacitors C1 to C4 by way of the driving circuit 24.

In this way, the voltage booster 221 can be provided with a sufficient voltage boosting performance. In accordance with this configuration, in operations (1) to (4) explained for the third embodiment, charging currents flowing from the input terminal 22 to the capacitors C1 to C4 are controlled by the constant current circuit 212, making it possible to further reduce the amount of noise with a higher degree of reliability.

Other Embodiments

It is to be noted that the present invention is not limited to the above embodiments, and the embodiments can be changed or modified as follows.

The voltage boosters 1 and 17 can be applied not only to an electronic control apparatus mounted on a vehicle but also to any other apparatus requiring a boosted voltage. The first and second voltages supplied to the other terminal of each capacitor are not limited to the input voltage (or the battery voltage VB) and the ground voltage, respectively. Each of the switching devices does not have to be an FET but can be a bipolar transistor or an IGBT.

It is also possible to combine the means employed in the first embodiment as a means for changing the switching frequency f from one to another with the means employed in the second embodiment as a means for switching the operating mode of the driving circuit from one to another. In addition, in the first embodiment, the switching frequency f can be changed to one of three or more values in dependence on the input voltage. Furthermore, the switching frequency f can be changed to any value in a contiguous range in dependence on the input voltage. By increasing the number of discrete values to which the switching frequency f can be changed or replacing such discrete values with values in a contiguous range, the driving performance of the driving circuit can made close to a required minimum value so that it is possible to further reduce the amount of generated noise.

The current limiting circuit 216 included in the fourth embodiment can be provided for each of the diodes D1, D2, D3 and D4 by being connected in series with respect to each of the diodes D1, D2, D3 and D4. In this case, the limited currents Ilmt generated by the current limiting circuits 216 can be uniform or different from each other. The current limiting circuits 216 can also be inserted into the power supply line 27, being connected to a current path for supplying a current from the input terminal 22 to the driving circuit 24 and the diode D1.

The constant current circuit 212 or the current limiting circuit 216 can be provided for at least one of the diodes D1, D2, D3 and D4 by being connected in series with respect to at least one of the diodes D1, D2, D3 and D4. In the case of the fifth embodiment shown in FIG. 11, for example, it is possible to provide a configuration in which the constant current circuits include only the constant current circuit 218, only the constant current circuit 219, only the constant current circuit 220, only the constant current circuits 212 and 218, only the constant current circuits 212 and 219, only the constant current circuits 212 and 220, only the constant current circuits 218 and 219, only the constant current circuits 218 and 220, only the constant current circuits 219 and 220, only the constant current circuits 212, 218 and 219 or only the constant current circuits 218, 219 and 220.

The voltage boosters 211, 215, 217 and 221 are not limited to those employed in an electronic control apparatus mounted on a vehicle, but can be used in any other apparatus requiring a boosted voltage. The first and second voltages supplied to the other terminal of each capacitor are not limited to the input voltage VB and the ground voltage respectively. Each of the switching devices employed in the embodiments can be a FET, a bipolar transistor or an IGBT.

Further modifications and alterations are also possible without departing from the spirit of the invention.

What is claimed is:

1. A voltage booster comprising:
   a plurality of first diodes connected to each other in series between a voltage input terminal and a voltage output terminal with polarities of the first diodes oriented in the same direction;
   a plurality of capacitors with one terminal of each of the capacitors connected to a junction point between any two successive ones of the first diodes;
   a driving circuit for supplying a first voltage and a second voltage as alternating voltages to the other terminal of each of the capacitors alternately, the driving circuit exhibiting a driving performance to generate a voltage at least equal to a predetermined voltage at the voltage output terminal even for a predetermined minimum input voltage supplied to the voltage input terminal with a predetermined load connected to the voltage output terminal;
   a voltage detection circuit for detecting a voltage supplied to the voltage input terminal; and
   a driving performance adjustment means for reducing the driving performance of the driving circuit by such a reduction quantity that, the greater a magnitude of the detected voltage, the greater the reduction quantity.

2. A voltage booster according to claim 1, wherein:
   the driving circuit has a switching device for changing a state of connections between the other terminals of the capacitors; and
   the driving performance adjustment means is constructed to reduce a switching frequency of the switching device by such a reduction quantity that, the greater the magnitude of the detected voltage, the greater the reduction quantity.

3. A voltage booster according to claim 2, wherein the driving performance adjustment means is constructed to adjust the switching frequency step by step in accordance with the detected voltage.

4. A voltage booster according to claim 3, wherein the driving performance adjustment means is constructed to set the switching frequency at a first frequency resulting in a maximum driving performance of the driving circuit when the detected voltage is lower than a predetermined threshold level, and set the switching frequency at a second frequency lower than the first frequency when the detected voltage is higher than the predetermined threshold level.

5. A voltage booster according to claim 2, wherein the driving performance adjustment means is constructed to continuously adjust the switching frequency in accordance with the detected voltage.

6. A voltage booster according to claim 1, wherein:
   the driving circuit is constructed to include FETs of the same conduction type;
   the FETs are connected to each other in series between the voltage input terminal and a ground terminal to sandwich the other terminal of any of the capacitors;
   the FETs are driven to operate complementarily to each other; and
   one of the FETs that is connected to the voltage input terminal has its gate driven by a voltage boosted by the driving circuit itself.

7. A voltage booster according to claim 6, further comprising:
   a plurality of second diodes each connected between the voltage input terminal and a common junction point between any two successive ones of the first diodes in such a way that polarities of the second diodes are oriented in the same direction as the polarities of the first diodes.

8. A voltage booster according to claim 1, wherein:
   the driving circuit is constructed to include a first pair of FETs, a second pair of FETs connected in parallel with the first pair, a third pair of FETs and a fourth pair of FETs connected in parallel with the third pair;
   the FETs in each pair are connected to each other in series between the voltage input terminal and a ground terminal to sandwich the other terminal of any of the capacitors;
   the FETs in each pair are driven to operate complementarily to each other; and
   the driving performance adjustment means drives all of the pairs of FETs when the magnitude of the detected voltage is lower than a predetermined threshold level, and drives only one of the first and the second pair of FETs and one of the third and fourth pairs of the FETs when the magnitude of the detected voltage is greater than the predetermined threshold level.

9. A voltage booster according to claim 8, wherein the driving performance adjustment means drives the FETs of the first to the fourth pairs at the same frequency irrespective of the magnitude of the detected voltage.

10. A voltage booster according to claim 1, further comprising:
    a plurality of second diodes each connected between the voltage input terminal and a common junction point between any two successive ones of the first diodes in such a way that polarities of the second diodes are oriented in the same direction as the polarities of the first diodes.

11. A voltage booster comprising:
a plurality of diodes connected to each other in series between a voltage input terminal and a voltage output terminal with polarities of the diodes oriented in the same direction;
a plurality of capacitors with one terminal of each of the capacitors connected to a junction point between any two successive ones of the diodes;
a driving circuit for supplying a first voltage and a second voltage as alternating voltages to the other terminal of each of the capacitors alternately; and
a current regulation circuit provided in a path supplying a charging current to the capacitors.

12. A voltage booster according to claim 11, wherein the current regulation circuit is provided in a path supplying the charging current from the voltage input terminal to the diodes.

13. A voltage booster according to claim 11, wherein:
the driving circuit is constructed to receive a current from the voltage input terminal; and
the current regulation circuit is provided in a path supplying a charging current from the voltage input terminal to the driving circuit.

14. A voltage booster according to claim 11, wherein the current regulation circuit is provided for each of the diodes, which are connected to each other in series, by being connected to each of the diodes in series.

15. A voltage booster according to claim 11, wherein the current regulation circuit includes:
a first transistor provided in a path through which charging and discharging currents flow to and from the capacitors;
a second transistor forming a current mirror circuit in conjunction with the first transistor; and
a constant current generator for supplying a constant current to the second transistor.

16. A voltage booster according to claim 11, wherein the current regulation circuit includes:
a transistor provided in a path through which charging and discharging currents flow to and from the capacitors; and
a resistor connected between a base of the transistor and a reference electric potential line.

17. A voltage booster according to claim 11, wherein a magnitude Im of a controlled current output by the current regulation circuit satisfies the following condition relation:

$$Im \geq C \cdot V \cdot f$$

where notation V denotes an accumulated-charge voltage appearing in each of the capacitors, f denotes a pumping frequency at which the driving circuit replaces the first voltage by the second voltage and vice versa and, notation C denotes a capacitance of each of the capacitors.

* * * * *